United States Patent
Fulton et al.

(10) Patent No.: US 8,102,591 B2
(45) Date of Patent: Jan. 24, 2012

(54) DISPLAY APPARATUS

(75) Inventors: Robin George Fulton, Kent (GB); Iain King Wilmington, Kent (GB)

(73) Assignee: BAE SYSTEMS plc, London (GB)

( * ) Notice: Subject to any disclaimer, the term of this patent is extended or adjusted under 35 U.S.C. 154(b) by 328 days.

(21) Appl. No.: 12/519,714

(22) PCT Filed: Dec. 12, 2007

(86) PCT No.: PCT/GB2007/050751
§ 371 (c)(1),
(2), (4) Date: Jun. 17, 2009

(87) PCT Pub. No.: WO2008/075095
PCT Pub. Date: Jun. 26, 2008

(65) Prior Publication Data
US 2010/0067095 A1    Mar. 18, 2010

(30) Foreign Application Priority Data

Dec. 18, 2006 (EP) .................................. 06270104
Dec. 18, 2006 (GB) .................................. 0625140.9

(51) Int. Cl.
*G02B 26/00* (2006.01)
*G02B 26/08* (2006.01)
*G02F 1/29* (2006.01)

(52) U.S. Cl. ........................................ 359/292; 359/298

(58) Field of Classification Search .......... 359/290–292, 359/298, 237, 242
See application file for complete search history.

(56) References Cited

U.S. PATENT DOCUMENTS
5,612,736 A    3/1997    Vogeley et al.
(Continued)

FOREIGN PATENT DOCUMENTS
WO    WO 2007/014792 A1    2/2007

OTHER PUBLICATIONS

Skaggs, Frank, et al., "Automatic Testing of the Digital Micromirror Device™ (DMD™)", IEEE/LEOS 1996 Summer Topical Meeting, Advanced Applications of Lasers in Materials and Processing, 1996, pp. 11-12.

*Primary Examiner* — Scott J Sugarman
*Assistant Examiner* — Brandi Thomas
(74) *Attorney, Agent, or Firm* — Scully, Scott, Murphy & Presser, PC

(57) ABSTRACT

A display apparatus (20) includes an electromagnetic radiation source (22) and digital micro-mirror device (21) having a plurality of micro-mirror elements on a surface thereof. The electromagnetic radiation source (22) is arranged to illuminate the digital micro-mirror device (21) and at least one micro-mirror element of the digital micro-mirror device (21) either reflects electromagnetic radiation along a primary path (23) to an exit lens (23) to form a desired image to be viewed by an operator or along a secondary path (25) to an electromagnetic radiation dump (26). The digital micro-mirror device (21) is also operable to generate a test image at the electromagnetic radiation dump (26) at a predetermined time. An electromagnetic radiation measurement arrangement (27) is arranged along the secondary path (25), between the digital micro-mirror device (21) and the radiation dump (26), to measures a luminance value of electromagnetic radiation representing the test image reflected by the digital micro-mirror device (21) and an associated comparator processor compares the measured luminance with an ideal luminance for the test image.

23 Claims, 4 Drawing Sheets

U.S. PATENT DOCUMENTS

Figure 1:
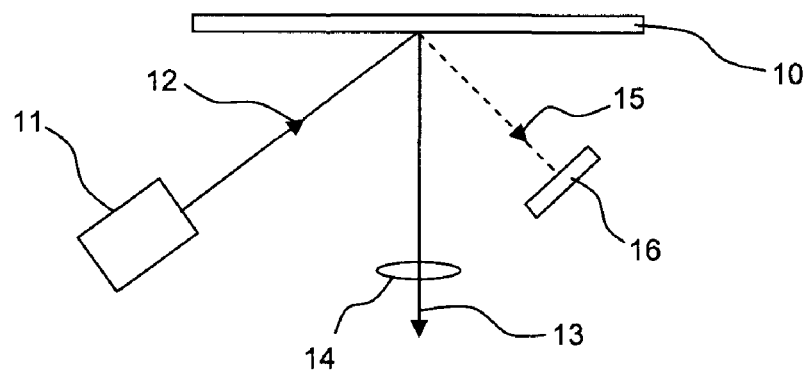

| | | |
|---|---|---|
| 5,754,286 A | 5/1998 | Sunagawa |
| 6,061,078 A * | 5/2000 | Ng et al. ............. 347/237 |
| 2001/0035944 A1 | 11/2001 | Sunagawa |
| 2002/0109076 A1 | 8/2002 | Tochio et al. |
| 2003/0218753 A1 | 11/2003 | Reuter |
| 2003/0234934 A1 | 12/2003 | Carr et al. |
| 2004/0051033 A1 | 3/2004 | Hagen et al. |
| 2006/0058637 A1 * | 3/2006 | Sommer ............. 600/411 |

* cited by examiner

DISPLAY APPARATUS

This invention relates to a display apparatus which is particularly, but not exclusively, suitable for use in a head up or head down type display apparatus.

A digital micro-mirror device is an optical semi-conductor component, which can be arranged to form a digital light processor for image projection technology. Such a digital micro-mirror device has a surface with a plurality of micro-mirrors arranged in a suitable array. Each micro-mirror can be considered to represent a single pixel of an image to be displayed. The micro-mirrors can be individually repositioned through an angular range of approximately ±10° to 12° so that when used with a suitable light source it can create "on" and "off" pixel states. For example, when a micro-mirror is in an "on" state, light from the light source is reflected from the micro-mirror at such an angle that is visible to an operator at a viewing point to make the micro-mirror appear to emit light, i.e. a pixel of the image appears brighter when in the "on" state. In an "off" state, light is reflected by the micro-mirror at such an angle that it is directed away from the viewing point, usually to a heat-sink or light dump, thus making the micro-mirror appear dark, i.e. a pixel of the image appears darker in the "off" state.

Each micro-mirror can include a aluminium substrate polished to provide a mirrored surface, for example approximately 16 micro-meters across. Each micro-mirror is supportably mounted on a support substrate by a compliant support to form a cantilever structure.

One method of actuating the mirror-mirror between the "on" and "off" states is to run an electric current around a circuit located on the edge of the micro-mirror whilst the micro-mirror is subjected to a magnetic field, thereby producing a force, which exerts itself on the cantilevered micro-mirror. Depending upon the direction of the electric current and magnetic field the micro-mirror will move between "on" and "off" states. By rapidly changing the direction of the current whilst holding the magnetic field constant, the micro-mirror can be made to switch between "on" and "off" states thousands of times per second.

Furthermore, to synchronise actuation of each micro-mirror, a required state is first loaded into an associated semiconductor memory cell, which is connected to the circuit located on the edge of the micro-mirror. A bias voltage retaining the micro-mirror in its current position is then removed, allowing the charge from the associated memory cell to prevail, thereby acting, if necessary, to move the micro-mirror. When the bias voltage is restored, the micro-mirror is once again held in position, and the next required state can be loaded into the associated memory cell.

This bias system of actuation has the advantage of reducing the voltage levels required to address each micro-mirror thereby the voltage from the memory cell can directly drive the micro-mirror to its desired position. Furthermore, the bias voltage can be removed from all the micro-mirrors at the same time to ensure that all micro-mirrors that need to be relocated move substantially simultaneously when under the influence of its associated memory cell and then the bias voltage can be reapplied.

To produce grey scales, each micro-mirror can be switched between "on" and "off" states at a given rate, in such a manner that the ratio of the "on" interval to the "off" interval determines the shade of grey produced in the pixel of the image. Conventional digital micro-mirror devices can be arranged to produce up to 1024 grey shades.

Digital micro-mirror devices form the heart of a digital light projector system. Such a projector system can be used to form colour images using either a single digital micro-mirror device and an associated colour wheel or three digital micro-mirror devices, one for each primary colour.

In a projector with a single digital micro-mirror device, colours are produced by placing a colour wheel between the light source and the digital micro-mirror device to be illuminated by the light source. The colour wheel is usually divided into at least three sections, one for each of the primary colours; red, green and blue. Light from the light source passes through a section of the colour wheel to produce light in one of the primary colours, which is used to illuminate the digital micro-mirror device. The colour wheel is rotated in synchronisation with the addressing of the digital micro-mirror device. In operation, when the red section of the colour wheel is between the light source and the digital micro-mirror device, the digital micro-mirror device is set to produce the red portion of the final image to be viewed at the viewing point. Similarly, when the green or blue sections of the colour wheel are each between the light source and the digital micro-mirror device, the digital micro-mirror device is arranged to produce the respective green and blue portions of the final image to be viewed. By producing the red, green and blue portions of the final image at a sufficient rate, a composite colour image will be produced at the viewing point. If required, a clear section on the colour wheel can be included to aid brightness of the final image. It will be understood that the sections of the colour wheel can correspond to one full rotation of the colour wheel or that the sequence of colour sections can be repeated a number of times around the colour wheel to either decrease the required rotational rate of the colour wheel or to increase the number of times the sequence is presented per frame of the final image.

It is anticipated that the use of a single micro-mirror device with an associated colour wheel will give way to systems having three micro-mirror devices illuminated with a single light source which produces red, green and blue light. Such a system uses a prism to split light from the light source into its red, green and blue components and suitable optical elements to direct each of these components to an associated micro-mirror device addressed to produce its respective component of the final image. Light reflected from each micro-mirror device is then combined to produce the final image at a viewing point.

FIG. 1, illustrates a prior art digital micro-mirror device 10 and associated light source 11. Light generated by light source 11 traverses first light path 12 to the digital micromirror device 10 whereat it is either reflected along a second light path 13 to an exit lens 14 or a third light path 15 to a light dump 16 depending on the position of an array of micromirror elements arranged on the surface of the digital micromirror device 10.

A key failure mode of the digital micro-mirror device 10 is that one or more of the micro-mirrors can become fixed, a so called "stuck" pixel state. Whilst for a number of display applications this is not a problem, there are some display applications wherein the integrity of the display device is paramount. For example, it would be desirable in a head up display or head down display to detect whether or not one or more micro-mirrors have become fixed.

It is an object of the present invention to determine the integrity of a digital micro-mirror device.

According to one aspect of the invention, a display apparatus includes at least one digital micro-mirror device having a plurality of micro-mirror elements; at least one electromagnetic radiation source arranged to illuminate each digital micro-mirror device; at least one micro-mirror element of the at least one digital micro-mirror device being arranged to reflect electromagnetic radiation within one of at least two pathways; at least one electromagnetic radiation measurement arrangement associated with at least one of the at least two pathways and arranged to measure electromagnetic radiation on that pathway; and at least one comparator arrangement associated with the electromagnetic radiation measurement arrangement arranged to compare a predetermined value for electromagnetic radiation on a pathway with a value of electromagnetic radiation measured by the electromagnetic radiation measurement arrangement.

One of the at least two pathways may include a primary path between a single electromagnetic radiation source and an exit lens via at least one digital micro-mirror device and one of the at least two pathways may include a secondary path between the single electromagnetic radiation source and an electromagnetic radiation dump via at least one digital micro-mirror device.

Each digital micro-mirror device may be arranged to reflect electromagnetic radiation along the primary path to form a desired image at the exit lens and each digital micro-mirror device may be arranged to reflect electromagnetic radiation along the secondary path to form a test image at the electromagnetic radiation dump. The secondary path may include the electromagnetic radiation measurement arrangement, the electromagnetic radiation measurement arrangement may be arranged to measure the electromagnetic radiation reflected by at least one digital micro-mirror device.

A first optical element may be arranged to intersect the primary path, an associated test image electromagnetic radiation source may be arranged to generate test image electromagnetic radiation, the first optical element may be arranged to direct the test image electromagnetic radiation along at least part of the primary path to the at least one digital micro-mirror device, the electromagnetic radiation measurement arrangement may be associated with the electromagnetic radiation dump and may be arranged to measure test image electromagnetic radiation reflected by the at least one digital micro-mirror device.

A test image electromagnetic radiation source may be arranged to generate test image electromagnetic radiation and may be arranged to direct the test image electromagnetic radiation along a second primary path to the at least one digital micro-mirror device, the electromagnetic radiation measurement arrangement may be associated with a second electromagnetic radiation dump and may be arranged to measure test image electromagnetic radiation reflected by the at least one digital micro-mirror device.

A first optical element may be arranged to intersect the primary path, an associated test image electromagnetic radiation source may be arranged to generate test image electromagnetic radiation, the first optical element may be arranged to direct the test image electromagnetic radiation along at least part of the primary path, a second optical element may be arranged to intersect the primary path and an electromagnetic radiation measurement arrangement associated with the second optical element, the electromagnetic radiation measurement arrangement being arranged to measure test image electromagnetic radiation reflected by the at least one digital micro-mirror device. The first optical element may intersect the primary path between the single electromagnetic radiation source and the at least one digital micro-mirror device and the second optical element may intersect the primary path between the at least one digital micro-mirror device and the exit lens. A second test image electromagnetic radiation source may be arranged to generate test image electromagnetic radiation, the test image electromagnetic radiation may be arranged to be directed along a pathway between the electromagnetic radiation dump and the at least one digital micro-mirror device and then along a pathway between the at least one digital micro-mirror device and the electromagnetic radiation measurement arrangement via the second optical element.

One of the at least two pathways may include a first primary path between a single electromagnetic radiation source and an exit lens via the at least one digital micro-mirror device and one of the at least two pathways may include a second primary path between the single electromagnetic radiation source and the exit lens via an optical switch arrangement and the at least one digital micro-mirror device. The optical switch arrangement may include an optical switch and an associated mirror.

One of the at least two pathways may include a first primary path between a first electromagnetic radiation source and an exit lens via the at least one digital micro-mirror device and one of the at least two pathways may include a second primary path between a second electromagnetic radiation source and the exit lens via the at least one digital micro-mirror device. The at least one digital micro-mirror device may be alternately illuminated by the first electromagnetic radiation source and the second electromagnetic radiation source at a predefined frequency, one of the at least two pathways may include a first secondary path between the first electromagnetic radiation source and a first electromagnetic radiation dump via the at least one digital micro-mirror device and one of the at least tow pathways may include a second secondary path between the second electromagnetic radiation source and a second electromagnetic radiation dump via the at least one digital micro-mirror device, each secondary path having an associated electromagnetic radiation measurement arrangement, the electromagnetic radiation measurement arrangement associated with one secondary path may be directly connected to a differential amplifier and the electromagnetic radiation measurement arrangement associated with another secondary path may be connected to the differential amplifier via a delay line having a predefined delay duration and the differential amplifier may be arranged to determine the difference between a signal produced by each electromagnetic radiation measurement arrangement.

One of the at least two pathways may include a first primary path between a single electromagnetic radiation source and an exit lens via the at least one digital micro-mirror device, one of the at least two pathways may include a secondary path between the single electromagnetic radiation source and a reflector and one of the at least two pathways may include a second primary path between the reflector and the exit lens via the at least one digital micro-mirror device.

The comparator arrangement may include a memory unit arranged to sum values obtained from an electromagnetic radiation measurement arrangement associated with one of the at least two pathways for a predetermined duration and to sum values obtained from an electromagnetic radiation measurement arrangement associated with another of the at least two pathways for the predetermined duration, the comparator arrangement may be arranged to subtract the sum of values for one pathway from the sum of values for the other pathway for the predetermined duration to calculate a difference value and the comparator arrangement may be arranged to determine changes between difference values over successive predetermined durations.

The at least one digital micro-mirror device may alternately be illuminated by the first electromagnetic radiation source and the second electromagnetic radiation source at a predefined frequency, one of the at least two pathways may include a first secondary path between the first electromagnetic radiation source and a first electromagnetic dump via the at least one digital micro-mirror device and one of the at least two pathways may include a second secondary path between the second electromagnetic radiation source and a second electromagnetic radiation dump via the at least one digital micro-mirror device, one secondary path having an associated electromagnetic radiation measurement arrangement.

The display apparatus may include one digital micro-mirror device for each of the primary colours of the visible electromagnetic spectrum arranged to generate a colour desired image. Alternatively, the display apparatus may include a single digital micro-mirror device arranged to generate a monochrome desired image. As a further alternative, the display apparatus may include a single digital micro-mirror device and associated synchronised colour wheel arranged to generate a colour desired image.

The at least one digital micro-mirror device may be arranged to generate a desired image for a majority of a predefined duration and to generate a test image for a minority of the predefined duration. The desired image may be formed from electromagnetic radiation at a wavelength within the visible electromagnetic spectrum visible. The test image may be formed from electromagnetic radiation at a wavelength outside of the visible electromagnetic spectrum.

The display apparatus may be arranged to be included in a head up display or head down display.

According to another aspect of the invention, a method of determining the integrity of a digital micro-mirror device, the method may include: illuminating at least one micro-mirror element of a digital micro-mirror device with electromagnetic radiation; arranging at least one micro-mirror element to reflect electromagnetic radiation within one of at least two pathways; measuring electromagnetic radiation on at least one pathway; and comparing an expected value for electromagnetic radiation on a pathway with a value of electromagnetic radiation measured for the pathway.

Figure 2:
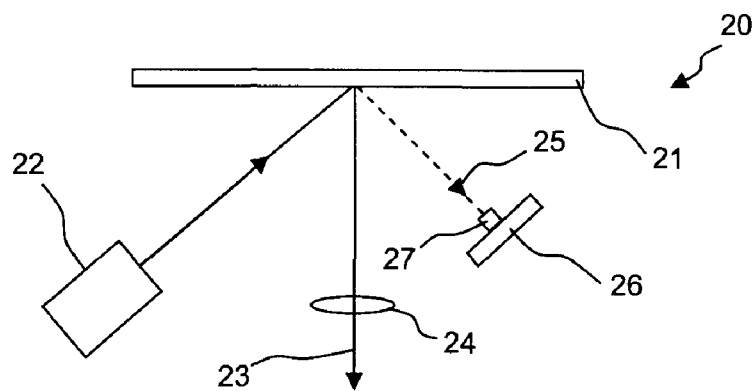
Figure 3A:
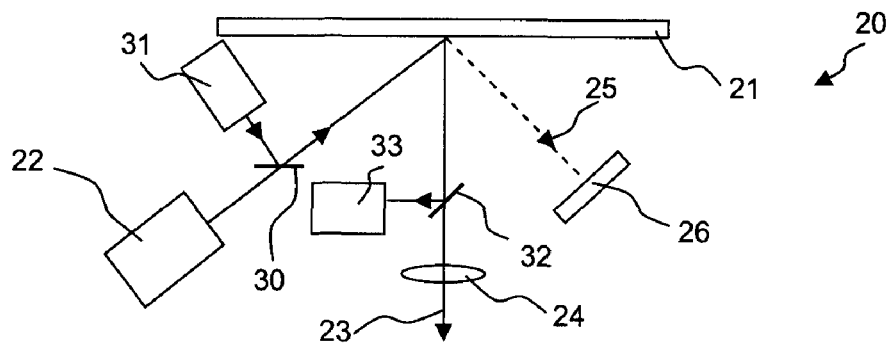
Figure 3B:
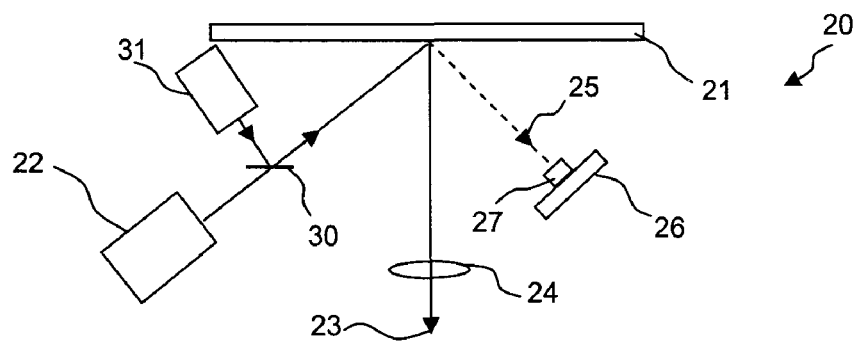
Figure 3C:
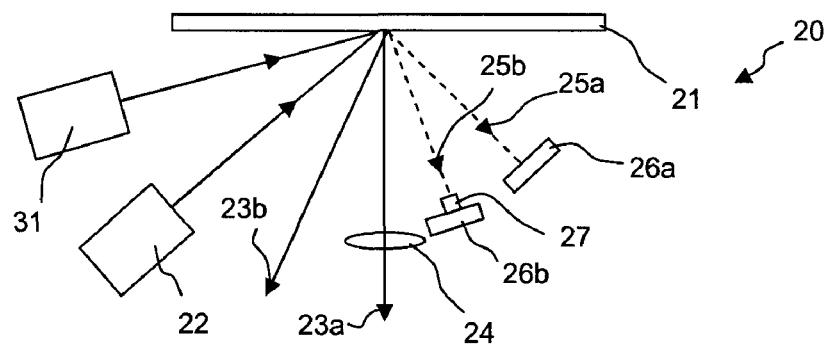
Figure 4:
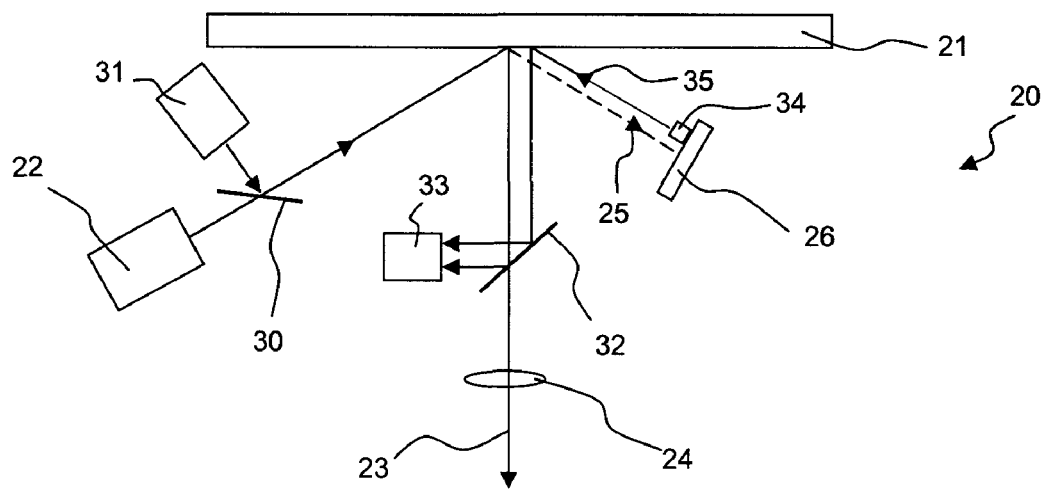
Figure 5:
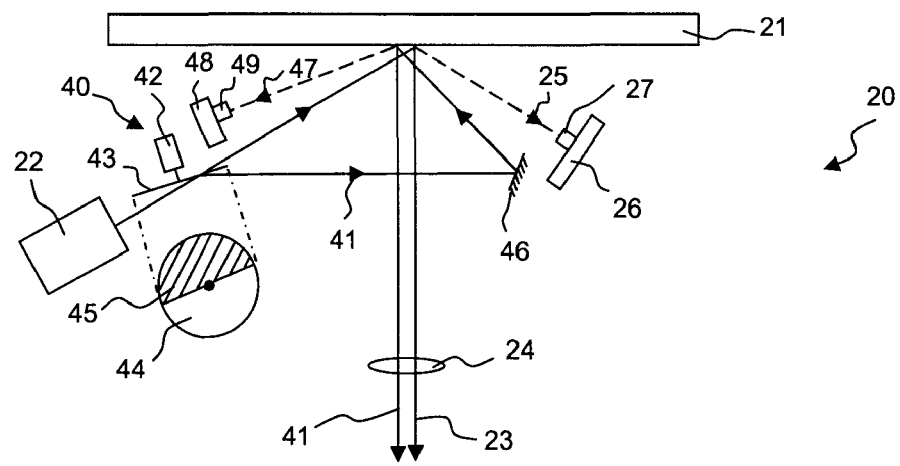
Figure 6A:
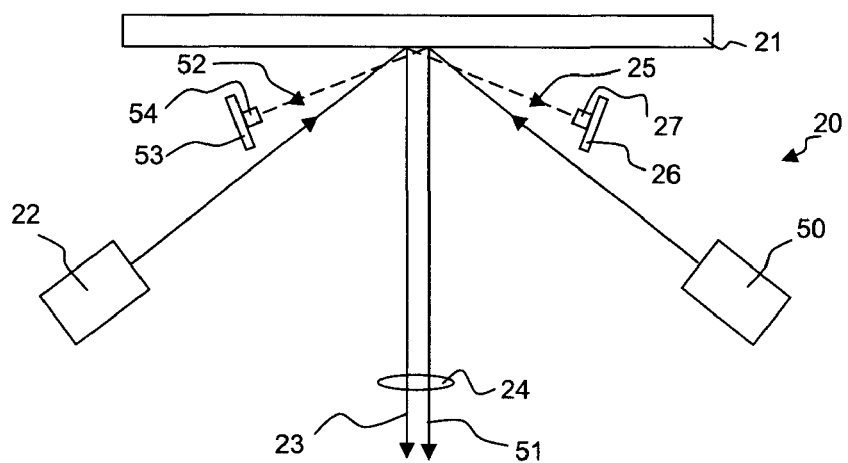
Figure 6B:
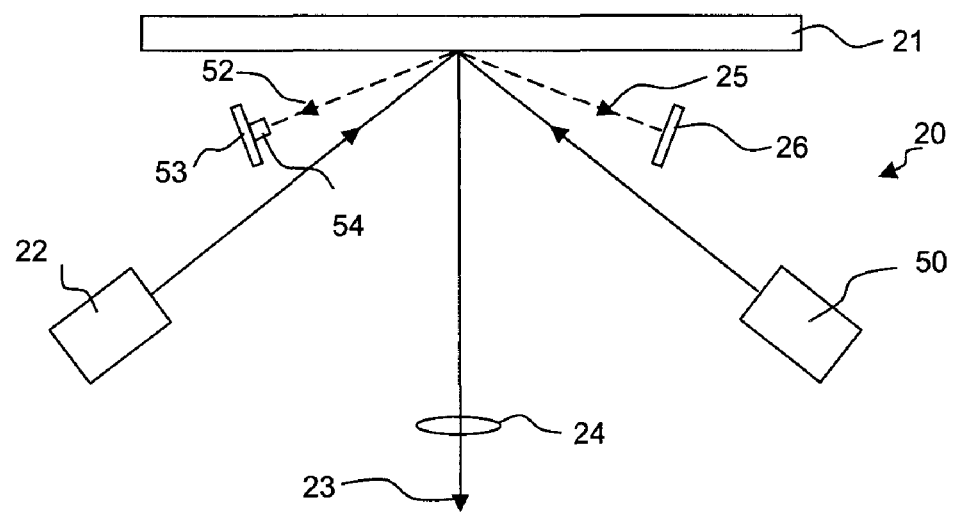
Figure 7:
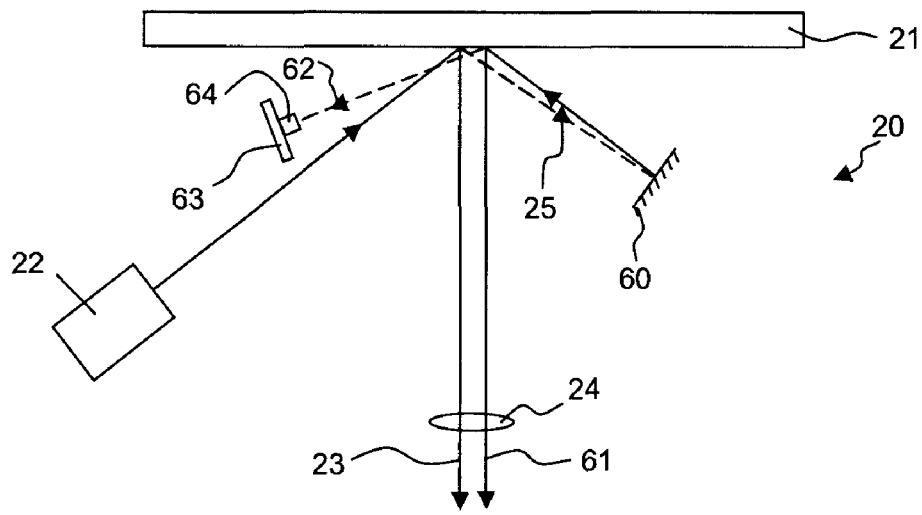

The invention will now be described, by way of example only, with reference to the accompanying drawings, in which:

FIG. 1 schematically illustrates a prior art digital micro-mirror device;

FIG. 2 schematically illustrates an embodiment of the display apparatus according to the invention;

FIGS. 3*a*, 3*b* and 3*c* schematically illustrate alternative embodiments of the display apparatus according to the invention, which includes a second electromagnetic radiation source for integrity determination;

FIG. 4 schematically illustrates a further alternative embodiment of the display apparatus according to the invention, which includes an alternatively arranged second electromagnetic radiation source for integrity determination;

FIG. 5 schematically illustrates a further alternative embodiment of the display apparatus according to the invention, which includes dual illumination using a single electromagnetic radiation source;

FIGS. 6*a* and 6*b* schematically illustrate a further alternative embodiment of the display apparatus according to the invention, which includes dual illumination by two electromagnetic radiation sources; and FIG. 7 schematically illustrates a further alternative embodiment of the display apparatus according to the invention, which includes dual illumination using a single electromagnetic radiation source.

Referring to FIG. 2, wherein there is schematically illustrated a display apparatus 20, which includes a digital micro-mirror device 21 having on a surface thereof a plurality of micro-mirror elements, not illustrated, arranged in a suitable array. An electro-magnetic radiation source 22, which is arranged to generate electro-magnetic radiation, is located relative to the digital micro-mirror device 21 so as to illuminate the micro-mirror elements of the digital micro-mirror device 21. Each micro-mirror element is operable to reflect electromagnetic radiation either along a primary path 23 from the electromagnetic radiation source 22 to an exit lens 24 of the display apparatus 20, or along a secondary path 25 from the electromagnetic radiation source 22 to an electromagnetic radiation dump 26 depending on the position of the micro-mirror element. It will be understood, that the electromagnetic radiation directed by each micro-mirror element along the primary path 23 will form a pixel of the desired image at the exit lens 24, whilst electromagnetic radiation reflected along the secondary path 25 will, at the appropriate time, form a test image at the electromagnetic radiation dump 26. Accordingly, the desired image to be formed at the exit lens 24 will be dependent on a graphics processor used to address the array of micro-mirror elements and can be refreshed a predefined number of times within a predetermined duration, i.e. a predetermined frame refresh rate for a given display cycle.

In this embodiment of the invention, the secondary path 25 between the digital micro-mirror device 21 and electromagnetic radiation dump 26 includes an electromagnetic radiation measurement arrangement 27, for example, a photodetector tuned to the wavelength of the electromagnetic radiation used to form the test image. In this case, the electromagnetic radiation measurement arrangement 27 is incorporated into the electromagnetic radiation dump 26.

Accordingly, a predetermined test image can be reflected by the micro-mirror elements along the secondary path 25 for a predetermined duration of the display cycle and the luminance value of electromagnetic radiation directed along the secondary path 25 measured by the electromagnetic radiation measurement arrangement 27. In this manner, given that the predetermined, expected or previously measured luminance of electromagnetic radiation will be already known for the test image, any deviation from the previously known luminance for the test image, as determined by a comparator processor, not illustrated, associated with the electromagnetic radiation measurement arrangement 27, will indicate that at least one of the micro-mirror elements is in a stuck position. Of course, there can be a number of different test images arranged to determine that a micro-mirror element is in a stuck position and whether or not such a micro-mirror element is stuck in an "on" position, i.e. such a position to only reflect electromagnetic radiation along the primary path 23 to the exit lens 24 such that the corresponding pixel of the desired image always appears "on" to an operator, or in and "off" position, i.e. such a position to only reflect electromagnetic radiation along the secondary path 25 to the electromagnetic radiation dump 26 such that the corresponding pixel of the desired image always appears "off" to an operator.

The electromagnetic radiation directed along the primary path 23 will be within the visible electromagnetic spectrum, i.e. wavelengths between approximately 400 nm and 700 nm, such that an operator can view the desired image generated at the exit lens 24 and relayed to a screen by a suitable optical relay arrangement. However, the test image directed along the secondary path 25 can be either within the visible electromagnetic spectrum, in which case the test image can be generated a predefined number of times in a given predetermined duration so as not to interfere with the generation of the desired image on the primary path 23 for the remainder of the predetermined duration and of a speed so as not to be detected by an operator, or alternatively the test image can be formed of electromagnetic radiation outside the electromagnetic spectrum visible to an operator, thereby reducing interference with the generation of the desired image along the primary path 23 as it is not observable by an operator.

A comparator processor, associated with the electromagnetic radiation measurement arrangement 27, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Referring to FIG. 3a, in which like references have been used to indicate similar features to those illustrated with reference to FIG. 2, there is illustrated an alternative embodiment of the present invention, wherein an optical element 30 intersects the primary path 23, between the electromagnetic radiation source 22 and digital micro-mirror device 21, to allow test image electromagnetic radiation generated by a test image electromagnetic radiation source 31 to enter the primary path 23. The test image electromagnetic radiation traverses the primary path 23 between the optical element 30 and the digital micro-mirror device 21 and, at the appropriate time, is reflected by micro-mirror elements along the primary path 23 to a second optical element 32, which intersects the primary path 23 between the digital micro-mirror device 21 and the exit lens 24. The second optical element 32 is arranged to direct the test image electromagnetic radiation from the primary path 23 to an electromagnetic radiation measurement arrangement 33 associated with the second optical element 32. It will be understood, that the first optical element 30 and second optical element 32 are arranged such that although they intersect the primary path 23 they respectively allow the electromagnetic radiation generated by the electromagnetic radiation source 22 to illuminate the digital micro-mirror device 21 and the desired image reflected from the micro-mirror elements of the digital micro-mirror device 21 to reach the exit lens 24, whilst retaining electromagnetic radiation associated with the test image within the section of the primary path 23 between first optical element 30 and second optical element 32. Again, the electromagnetic radiation measurement arrangement 33 acts in the same manner as electromagnetic radiation arrangement 27 described with reference to FIG. 2. First and second optical elements 30, 32 can be an optical switch or electromagnetic radiation choppers suitably synchronised with the generation of the test image electromagnetic radiation or suitably arranged diachronic coated prisms or mirrors to allow electromagnetic radiation associated with the desired image to pass.

Test image electromagnetic radiation source 31 can be a light emitting diode in the infrared range of the electromagnetic spectrum and the electromagnetic radiation arrangement 32 can be arranged to receive and process electromagnetic radiation generated by the test image electromagnetic radiation source 31 to determine the luminance of the electromagnetic radiation received. The electromagnetic radiation measurement arrangement 33 includes a photocell to determine the luminance of electromagnetic radiation received and an associated comparator processor to compare a luminance value determined by the electromagnetic radiation measurement arrangement 33 and that predetermined, expected or measured for a given test image.

In use, the digital micro-mirror device 21 is arranged to generated a desired image for a majority of a predefined duration, for example, $5/7^{th}$ of a display cycle, and to generate a test image for a minority of the predefined duration, for example $1/7^{th}$ of the display cycle. In this display apparatus 20, whilst the test image is being generated by the digital micro-mirror device 21 the electromagnetic radiation source 22 can be inhibited from illuminating the digital micro-mirror device 21 and electromagnetic radiation generated by the test image electromagnetic radiation source 31 allowed to illuminate the digital micro-mirror device 21. Therefore, for the test image portion of the display cycle the luminance of the electromagnetic radiation generated by the test image electromagnetic source 31 can the measured by the electromagnetic radiation measurement arrangement 33. It will be noted that if the electromagnetic radiation source 22 and test electromagnetic radiation 31 are in mutually exclusive regions of the electromagnetic spectrum, then the electromagnetic radiation source 22 will not need to be inhibited from illuminating the digital micro-mirror display during the generation of the test image.

A comparator processor, associated with the electromagnetic radiation measurement arrangement 33, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Referring to FIG. 3b, wherein like references have been used to indicated similar integers to those illustrated with reference to FIGS. 2 and 3a, an alternative embodiment of the display apparatus 20 to that described with reference to FIG. 3a includes a first electromagnetic radiation source 22 arranged to illuminate a digital micro-mirror device 21 so as to generate a desired image when the digital micro-mirror device 21 is appropriately addressed by a graphics processor, not illustrated, and a second electromagnetic radiation source 31 which is arranged to illuminate the digital micro-mirror device 21 so as to generate a test image when the digital micro-mirror device 21 is appropriately addressed by the graphics processor. Each micro-mirror element of the digital micro-mirror device 21 is operable to either reflect electromagnetic radiation along a primary path 23 from the first electromagnetic radiation source 22 to an exit lens 24 of the display apparatus 20, or along a secondary path 25 from the first electromagnetic radiation source 22 to an electromagnetic radiation dump 26 depending on the position of each micro-mirror element. If the electromagnetic radiation used to form the desired image and the test image are mutually exclusive in wavelength and/or if it is possible to inhibit electromagnetic radiation from the first electromagnetic radiation source 22 illuminating the digital micro-mirror device during the generation of the test image by the second electromagnetic radiation source 31, then an optical element 30 can be used to inject electromagnetic radiation from the second electromagnetic radiation source 31 at a suitable intersection along the primary path 31 between the first electromagnetic radiation source 22 and the digital micro-mirror device 21. Furthermore, the secondary path 25 between the digital micro-mirror device 21 and the electromagnetic radiation dump 26 includes an electromagnetic radiation measurement arrangement 27, for example, a photo-detector tuned to the wavelength of the electromagnetic radiation used to form the test image. In this manner, as the test image is either generated at such a time not to interfere with the generation of the desired image and/or the test image is of a wavelength not observable by an operator, the requirement for a second optical element 32 and associated electromagnetic radiation measurement arrangement 33 as used in the embodiment described with reference to FIG. 3a is obviated and the luminance of the test image is measured by the electromagnetic radiation measurement arrangement 27 along the secondary path 25.

A comparator processor, associated with the electromagnetic radiation measurement arrangement 27, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Alternatively, referring to FIG. 3c, wherein like references have been used to indicated similar integers to those illustrated with reference to FIGS. 2 and 3a, an alternative embodiment of the display apparatus 20 to that described with reference to FIGS. 3a and 3b includes a first electromagnetic radiation source 22 arranged to illuminate a digital micro-mirror device 21 so as to generate a desired image when the digital micro-mirror device 21 is appropriately addressed by a graphics processor, not illustrated, and a second electromagnetic radiation source 31 which is arranged to illuminate the digital micro-mirror device 21 so as to generate a test image when the digital micro-mirror device 21 is appropriately addressed by the graphics processor. Each micro-mirror element of the digital micro-mirror device 21 is operable to either reflect electromagnetic radiation along a primary path 23a from the first electromagnetic radiation source 22 to an exit lens 24 of the display apparatus 20, or along a secondary path 25a from the first electromagnetic radiation source 22 to an electromagnetic radiation dump 26a depending on the position of each micro-mirror element. Furthermore, the second electromagnetic radiation source 31 is located such that each micro-mirror element of the digital micro-mirror device 21 is operable to either reflect electromagnetic radiation along a primary path 23b from the second electromagnetic radiation source 31 which does not exit the display apparatus 20 via the exit lens 24, or along a secondary path 25b from the second electromagnetic radiation source 31 to an electromagnetic radiation dump 26b depending on the position of each micro-mirror element. Furthermore, the secondary path 25b between the digital micro-mirror device 21 and the electromagnetic radiation dump 26b includes an electromagnetic radiation measurement arrangement 27, for example, a photo-detector tuned to the wavelength of the electromagnetic radiation used to form the test image. In this manner, as the test image is either generated at such a time not to interfere with the generation of the desired image and/or the test image is of a wavelength not observable by an operator, the requirement for a first and second optical elements 30, 32 and associated electromagnetic radiation measurement arrangement 33 as used in the embodiment described with reference to FIG. 3a or optical element 30 as used in the embodiment of FIG. 3b is obviated and the luminance of the test image is measured by the electromagnetic radiation measurement arrangement 27 along the secondary path 25b.

A comparator processor, associated with the electromagnetic radiation measurement arrangement 27, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

FIG. 4 illustrates an alternative embodiment of the display apparatus 20 to that described with reference to FIG. 3a, wherein like references have been used to indicate similar integers to those illustrated in FIG. 3a. In this embodiment, a second test image electromagnetic radiation source 34 is arranged to generate test image electromagnetic radiation, which is used to illuminate a digital micro-mirror device 21 via path 35, that is in a direction opposite to that of the secondary path 25, and is reflected by the digital micro-mirror device 21 to an electromagnetic radiation measurement arrangement 33 via a second optical element 32. In this manner, during the $\frac{1}{7}^{th}$ segment of the display cycle a first test image electromagnetic radiation source 31 and the second test image electromagnetic radiation source 34 are turned on sequentially such that the electromagnetic radiation from each is reflected by the digital micro-mirror device 21 to the electromagnetic radiation measurement arrangement 33, which measures the luminance of electromagnetic radiation received individually from the two test image electromagnetic radiation sources 31 and 34. Again, during the $\frac{6}{7}^{th}$ duration of the display cycle the test image electromagnetic radiation sources 31 and 34 are sequentially switched on and the luminance is determined by the electromagnetic radiation measurement arrangement 33 for electromagnetic radiation reflected by the digital micro-mirror device 21. This results in four measured luminance values at the electromagnetic radiation measurement arrangement 33, which can be processed, using a comparator processor associated with the electromagnetic radiation measurement arrangement 33, to determine whether or not the luminance values of reflected electromagnetic radiation from the digital micro-mirror device 21 alter with time. In this example, the test image is in fact the inverse image of the desired image to be displayed at the exit lens 24.

Alternatively, this method can be modified by alternatively turning "on" and then "off" all the micro-mirror elements of the digital micro-mirror display 21 during the test image duration of a display cycle and verifying at the electromagnetic measurement arrangement 33 that very little or no electromagnetic radiation has been reflected from either test image electromagnetic radiation sources 31 and 34 to the electromagnetic measurement arrangement 33 at the appropriate time. If any of the luminance values determined by the electromagnetic radiation measurement arrangement 33 differ during the "on" and "off" cycles then this is an indication that at least one of the micro-mirror elements is in a stuck position. Of course, it can be envisaged that there are a number of test images that seek to determine whether or not a row or column of the digital micro-mirror device 21 or an individual micro-mirror element provides the correct luminance at the electromagnetic radiation measurement arrangement 33, thereby determining which of the micro-mirror elements is in a stuck position.

A comparator processor, associated with electromagnetic radiation measurement arrangement 33, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Referring to FIG. 5, in which like references have been used to indicate similar features to those illustrated with reference to FIG. 2, there is shown an alternative embodiment of the present invention, wherein a first primary path 23 between the electromagnetic radiation source 22 and digital micro-mirrored device 21 includes an optical switch arrangement 40, which intersects the first primary path 23 to allow electromagnetic radiation generated by the electromagnetic radiation source 22 to be switched to a second primary path 41. Optical switch arrangement 40, in this example, comprises a motor arrangement 42 carrying a disk 43, which includes a transparent section 44 and a reflective section 45, such that when the disk 43 is rotated by the motor arrangement 42, electromagnetic radiation generated by the electromagnetic radiation source 22 either passes through the transparent section 44 to follow the first primary path 23 or is reflected by the reflective section 45 to follow the second primary path 41. Electromagnetic radiation following the second primary path 41 is reflected by a mirror 46 onto the digital micro-mirror device 21 where it is either reflected through the exit lens 24 or to a second secondary path 47 to a second electromagnetic radiation dump 48. An electromagnetic radiation measurement arrangement 49 is arranged along the second secondary path 47 between the digital micro-mirror device 21 and the second electromagnetic radiation dump 48.

Therefore, the electromagnetic radiation from the electromagnetic radiation source 22 follows two primary paths 23 or 41 to the digital micro-mirror device 21 depending on the position of the rotating disk 43. Accordingly, if the reflective section 45 of the rotating disk 43 intersects the first primary path 23 then the digital micro-mirror device 21 is illuminated via the second path 41 or otherwise if the electromagnetic radiation from the electromagnetic radiation source 22 passes through the transparent section 44 of the rotating disk 43 then the digital micro-mirror device 21 is illuminated via the second primary path 23.

In this manner, both electromagnetic radiation measurement arrangements 27 and 49 can measure luminance of electromagnetic radiation reflected by the digital micro-mirror device 21 during generation of the test image. These measured luminance values can be compared with one another or with an ideal luminance expected for a test image to determine whether or not there are stuck micro-mirror elements.

A comparator processor, associated with electromagnetic radiation measurement arrangements 27 and 49, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

In a alternative embodiment to that of FIG. 5, the disk 43 is rotated at approximately 60 revolutions per minute and is synchronised to a graphics processor arranged to generate the desired image at digital micro-mirror device 21. The transition between the reflective section 45 and transparent section 44 is arranged to occur between successive frames of the desired image to be generated. The graphics processor is synchronised to provide the desired image while the transparent section 44 of the rotating disk intersects the first primary path 23 and to provide an inverse of the desired image when the reflective section 45 intersects the first primary path 23. Accordingly, if all the micro-mirror elements of the digital micro-mirror device 21 are operating correctly there will be no difference between the desired image provided by the first primary path 23 or the second primary path 41. If any of the micro-mirror elements are stuck in either an "off" or "on" state, a flicker of the desired image at the pixel corresponding to the stuck micro-mirror element will occur at the spin frequency of the disk 43. The flicker of the desired image may be apparent to an operator of the display apparatus 20 that a micro-mirror element has become stuck.

However, when it is not desirable or practical for the operator of the display apparatus 20 to monitor for flicking of one or more pixels of the desired image and hence stuck micro-mirror elements, for example in a high stress or high workload environment, an appropriate electromagnetic radiation measurement arrangement, not shown, can be arranged in the first and second primary paths 23 and 41 between the digital micro-mirror device 21 and the exit lens 24 to monitor modulations in the value of electromagnetic radiation reflected from the digital micro-mirror device 21. If none of the micro-mirror elements are in a stuck position then the electromagnetic radiation measurement arrangement, not shown, will provide a constant value for electromagnetic radiation reflected by the digital micro-mirror device 21. Accordingly, this will obviated the need for electromagnetic radiation measurement arrangements 27 and 49.

This embodiment can also be modified to include more transparent sections 44 and reflective sections 45 around the disk 43. For example, the disk 43 can be divided into four quarter sections, including two opposing reflective sections 45 and two opposing transparent sections 44. In this manner, the rate at which either the first primary path 23 or the second primary path 41 illuminates the digital micro-mirror device 21 can be doubled.

It will be understood that an equivalent electro-optical device could be used as a substitute for the optical switch arrangement 40 to increase reliability of the display apparatus 20 and to ease synchronisation of the graphics processor generating the desired image via the digital micro-mirror device 21 and the switching of the illumination of the digital micro-mirror device 21 via the first primary path 23 and second primary path 41.

A comparator processor, associated with electromagnetic radiation measurement arrangement, can be arranged such that it can determine a difference value between the luminance of measured and the expected or idea luminance in the first and second primary paths 23 and 41. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Referring to FIG. 6a, wherein like references have been used to indicate similar integers to those illustrated with reference to FIG. 2, there is shown an alternative embodiment of the present invention, wherein the digital micro-mirror device 21 is illuminated by electromagnetic radiation from two independent sources. In a similar manner to FIG. 2, a first electromagnetic radiation source 22 is arranged to generate electromagnetic radiation and is located relative to the digital micro-mirror device 21 so as to illuminate the micro-mirror elements of the digital micro-mirror device 21. Each micro-mirror element is arranged to reflect electromagnetic radiation either along a first primary path 23 from the electromagnetic radiation source to an exit lens 24 of the display apparatus 20, or along a first secondary path 25 from the first electromagnetic radiation source 22 to a first electromagnetic radiation dump 26 depending on the position of the micro-mirror element. Again, the electromagnetic radiation is directed via appropriately addressed micro-mirror elements along the first primary path 23 to produce a desired image at the exit lens 24, whilst electromagnetic radiation reflected along the first secondary path 25, at the appropriate time, will form a test image at the electromagnetic dump 26. In this embodiment of the invention, the first secondary path 25 between the digital micro-mirror device 21 and the first electromagnetic radiation dump 26 includes a first electromagnetic radiation measurement arrangement 27, for example a photo-detector tuned to the wavelength of the electromagnetic radiation forming the test image. Accordingly, a predetermined test image can be reflected by the micro-mirror elements along the first secondary path 25 and a luminance value of electromagnetic radiation directed along the first secondary path 25 measured by the first electromagnetic radiation measurement arrangement 27. In this manner, given that the value of electromagnetic radiation has already been predetermined for the test image, any deviation from the previously known value for the test image will indicate that a least one of the micro-mirror elements is in a stuck position.

In this embodiment, a second electromagnetic radiation source 50 is arranged to illuminate the digital micro-mirror device 21 via a second primary path 51 in a manner similar to that of the first primary path 23 associated with the first electromagnetic radiation source 22. That is, each micro-mirror element is arranged to reflect electromagnetic radiation either along the second primary path 51 from the second electromagnetic radiation source 50 to the exit lens 24 of the display apparatus 20 or along a second secondary path 52 from the second electromagnetic radiation source 50 to a second electromagnetic radiation dump 53 depending on the position of the micro-mirror element. The second secondary path 52 includes a second electromagnetic radiation measurement arrangement 54 between the digital micro-mirror device 21 and the second electromagnetic radiation dump 53 to measure electromagnetic radiation reflected by the micro-mirror elements of the digital micro-mirror device.

The electromagnetic radiation sources 22 and 50 are synchronously arranged with respect to the desired image created by the digital micro-mirror device 21 such that when the digital micro-mirror device 21 creates the desired image only electromagnetic radiation from the first electromagnetic radiation source 22 illuminates the digital micro-mirror device 21. Conversely, when the digital micro-mirror device 21 generates an inverse of the desired image only electromagnetic radiation from second electromagnetic radiation source 50 illuminates the digital micro-mirror device 21. It will be understood that although during illumination by the second electromagnetic source 50 the digital micro-mirror device 21 is set to produce an inverse of the desired image, as electromagnetic radiation is incident on the digital micro-mirror device 21 from a difference direction, the desired image is correctly reproduced at the exit lens 24. In this manner, the digital micro-mirror device 21 is illuminated from two different sources and separate luminance values for electromagnetic radiation can be determined by electromagnetic radiation measurement arrangements 27 and 54 for a given test image. The electromagnetic radiation sources 22 and 50 are arranged to alternately illuminate the digital micro-mirror device at a predefined frequency. One of the luminance values received from one of the electromagnetic radiation measurements arrangements 27 or 54 is delayed by a delay line, not illustrated, prior to determining the differences between the two values using a differential amplifier, also not shown. In this manner, any variation in the luminance of electromagnetic radiation received by each electromagnetic radiation measurement arrangement 27 and 54, i.e. the test image, will indicate that one or more of the micro-mirror elements of the digital micro-mirror device 21 have become stuck in an "on" or "off" state. It will be noted that the delay line is used to ensure that a value received from one of the electromagnetic radiation measurement arrangements 27 or 54 is compared with the correct inverse test image measured by the other electromagnetic radiation measurement arrangement 27 or 54. In this embodiment of the invention, it will be noted that a test image incident on the first electromagnetic radiation measurement arrangement 27 will be the inverse of the desired image created by electromagnetic radiation from the first electromagnetic radiation source 22. Conversely, a test image incident on the second electromagnetic radiation measurement arrangement 54 will be the inverse of the desired image created by electromagnetic radiation from the second electromagnetic radiation source 50.

For example, if the digital micro-mirror device 21 is updated at a refresh rate of 120 Hz and a frame for the desired image is updated at a refresh rate of 60 Hz then alternate illumination from the electromagnetic radiation sources 22 and 50 will be at a rate of 60 Hz. Therefore, the signal from one electromagnetic radiation measurement arrangement 27, 54 will need to be delayed by one over the refresh rate, in this example 1/60 or 16.67 milliseconds using the delay line. A comparison of two signals representing luminance measured by the electromagnetic radiation measurement arrangements 27, 54 with a differential amplifier should indicate identical signals if no micro-mirror elements are in a stuck position. It will be noted, that if a micro-mirror element is in a stuck position then a signal from one electromagnetic radiation measurement arrangement 27 or 54 will increase whilst the signal associated with the other electromagnetic radiation measurement arrangement 27 or 54 will decrease by a similar amount.

In an alternative example, the electromagnetic radiation sources 22 and 50 are arranged to each alternately illuminate the digital micro-mirror device 21 for a set of predetermined number of frames, for example fifteen frames, and the electromagnetic radiation measurement arrangement 27 or 54 associated with its respective electromagnetic radiation source 22 or 50 is arranged to store the sum of the luminance of electromagnetic radiation received at the electromagnetic radiation measurement arrangement 27, 54. By subtracting the sum recorded by one electromagnetic radiation measurement arrangement 27 or 54 from that recorded by the other electromagnetic radiation measurement arrangement 27 or 54 a difference value will be obtained. This process is then repeated over a successive sets of a predetermined number of frames, i.e. fifteen frames, and if a stuck pixel exists the difference value will gradually increase or decrease depending on whether or not a micro-mirror element is stuck in an "on" or "off" position. The gradient of the change in difference value will be proportional to the number of micro-mirror elements that are stuck in an "on" or "off" position.

The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Referring to FIG. 6*b*, wherein like references have been used to indicate similar integers to those illustrated with reference to FIGS. 2 and 6*b*, there is shown an alternative embodiment to that of FIG. 6*b*, wherein the digital micro-mirror device 21 is illuminated by electromagnetic radiation from two independent sources. In a similar manner to FIG. 2, a first electromagnetic radiation source 22 is arranged to generate electromagnetic radiation and is located relative to the digital micro-mirror device 21 so as to illuminate the micro-mirror elements of the digital micro-mirror device 21. Each micro-mirror element is arranged to reflect electromagnetic radiation either along a first primary path 23 from the electromagnetic radiation source to an exit lens 24 of the display apparatus 20, or along a first secondary path 25 from the first electromagnetic radiation source 22 to a first electromagnetic radiation dump 26 depending on the position of the micro-mirror element. Again, the electromagnetic radiation is directed via appropriately addressed micro-mirror elements along the first primary path 23 to produce a desired image at the exit lens 24, whilst electromagnetic radiation reflected along the first secondary path 25, at the appropriate time, will be dissipated at the electromagnetic dump 26.

In this embodiment, a second electromagnetic radiation source 50 is arranged to illuminate the digital micro-mirror device 21 via a second primary path 51 in a manner similar to that of the first primary path 23 associated with the first electromagnetic radiation source 22. That is, each micro-mirror element is arranged to reflect electromagnetic radiation either along the second primary path 51 from the second electromagnetic radiation source 50 to the exit lens 24 of the display apparatus 20 or along a second secondary path 52 from the second electromagnetic radiation source 50 to a second electromagnetic radiation dump 53 depending on the position of the micro-mirror element. In this embodiment of the invention, the second secondary path 52 between the digital micro-mirror device 21 and the second electromagnetic radiation dump 53 includes an electromagnetic radiation measurement arrangement 54, for example a photo-detector tuned to the wavelength of the electromagnetic radiation forming the test image. Accordingly, a predetermined test image can be reflected by the micro-mirror elements along the second secondary path 52 and a luminance value of electromagnetic radiation directed along the second secondary path 52 measured by the electromagnetic radiation measurement arrangement 54. In this manner, given that the value of electromagnetic radiation has already been predetermined for the test image, any deviation from the previously known value for the test image will indicate that a least one of the micro-mirror elements is in a stuck position.

The electromagnetic radiation sources 22 and 50 are synchronously arranged with respect to the desired image created by the digital micro-mirror device 21 such that when the digital micro-mirror device 21 creates the desired image only electromagnetic radiation from the first electromagnetic radiation source 22 illuminates the digital micro-mirror device 21. Conversely, when the digital micro-mirror device 21 generates an inverse of the desired image only electromagnetic radiation from second electromagnetic radiation source 50 illuminates the digital micro-mirror device 21. It will be understood that although during illumination by the second electromagnetic source 50 the digital micro-mirror device 21 is set to produce an inverse of the desired image, as electromagnetic radiation is incident on the digital micro-mirror device 21 from a difference direction, the desired image is correctly reproduced at the exit lens 24. In this manner, the digital micro-mirror device 21 is illuminated from two different sources. The electromagnetic radiation sources 22 and 50 are arranged to alternately illuminate the digital micro-mirror device at a predefined frequency.

A comparator processor, associated with the electromagnetic radiation measurement arrangement 54, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Referring to FIG. 7, wherein like references have been used to indicate similar integers to those illustrated with reference to FIG. 2, there is shown an alternative embodiment of the present invention, wherein a digital micro-mirror device 21 is illuminated by a single electromagnetic radiation source 22 from two directions. In a similar manner to FIG. 2, the electromagnetic radiation source 22 is arranged to generate electromagnetic radiation and is located relative to the digital micro-mirror device 21 so as to illuminate the micro-mirror elements of the digital micro-mirror device 21. Each micro-mirror element is arranged to reflect electromagnetic radiation either along a first primary path 23 from the electromagnetic radiation source to an exit lens 24 of the display apparatus 20, or along a first secondary path 25 from the electromagnetic radiation source 22 to an electromagnetic radiation dump 26 depending on the position of the micro-mirror element. The electromagnetic radiation directed via appropriate micro-mirror elements along the first primary path 23 will form a desired image at the exit lens 24, whilst electromagnetic radiation reflected along the first secondary path 25 is directed to a reflector 60.

In this embodiment, electromagnetic radiation from the first secondary path 25 is recycled by reflection from the reflector 60 to form a second primary path 61 which illuminates the digital micro-mirror device 21. In this manner, the digital micro-mirror device 21 is illuminated from a single source from two different directions. Again, the digital micro-mirror device 21 will reflect incident electromagnetic radiation either along the second primary path 61 to the exit lens 24 or long a second secondary path 62 to a electromagnetic radiation dump 63 depending on the position of the micro-mirror elements. The second secondary path 62 includes an electromagnetic radiation measurement arrangement 64 between the digital micro-mirror device 21 and the electromagnetic radiation dump 63. The electromagnetic radiation measurement arrangement 64 can be, for example, a photo-detector tuned to the correct wavelength of the electromagnetic radiation forming the test image. Accordingly, in use a predetermined test image can be reflected by the micro-mirror elements along the second secondary path 62 and a luminance value of electromagnetic radiation directed along the second secondary path 62 measured by the electromagnetic radiation measurement arrangement 64. In this manner, given that an ideal value of electromagnetic radiation is already known for the test image, any deviation from the previously known value for the test image will indicate that a least one of the micro-mirror elements is in a stuck position.

A comparator processor, associated with the electromagnetic radiation measurement arrangement 64, can be arranged such that it can determine a difference value between the luminance of measured and the expected or idea luminance. The difference value can be monitored over time such that when it reaches a predefined level, an alarm can be triggered indicating a problem with the integrity of the display apparatus 20, i.e. too many micro-mirror elements are stuck in "on" or "off" positions to maintain the accuracy of the desired image.

Furthermore, all the embodiments described with reference FIGS. 2 to 7 are discussed in terms of a single digital micro-mirror device 21 which will generate a monochrome desired image. However, it will be understood that for certain purposes there can be more than one digital micro-mirror device 21 in a given display apparatus 20, for example, three digital micro-mirror devices 21, one for each of the primary colours of the visible electromagnetic spectrum arranged to generate a colour desired image. Alternatively, it is also possible to have a single digital micro-mirror device 21 and associated synchronised colour wheel or a single digital micro-mirror device and associated multicoloured light source to generate a colour desired image. The electromagnetic radiation source can be a suitable laser apparatus, a single light emitting diode or, for additional brightness of the desired image, an array of light emitting diodes with a suitable lens arrangement to illuminate the digital micro-mirror device 21.

Again, all the embodiments described with reference to FIGS. 2 to 7 require a predetermined, idea or expected luminance to be compared with a measured luminance at the appropriate electromagnetic radiation measurement arrangement. It will be understood that the predetermined, idea or expected luminance can be an initial measured and recorded luminance or an average of measured and recorded luminance using the appropriate electromagnetic radiation measurement arrangement and that this assumes that the initial measured and record luminance or average of measured and recorded luminance includes no or at least below a predefined number of stuck micro-mirror elements.

It will be understood that to produce a grey scale in a monochrome display apparatus 20 or to vary the tome of a colour in a colour display apparatus 20, each micro-mirror element can be switched between "on" and "off" states at a given rate, in such a manner that the ratio of the "on" interval to the "off" interval will determine the shade of grey or tone of colour produced in the pixel of the desired image.

Furthermore, it will be understood by those skilled in the art that although the various embodiments of the present invention have been described and illustrated separately, it is possible to combine one or more elements or features of the described embodiments in a single display apparatus.

The present invention can be used in a display system required to have a enhanced degree of integrity, for example a head up or head down type display system.

The invention claimed is:

1. A display apparatus, including:
    at least one digital micro-mirror device having a plurality of micro-mirror elements;
    at least one electromagnetic radiation source arranged to illuminate each digital micro-mirror device and each digital micro-mirror device being arranged to generate a desired image and a test image;
    at least one micro-mirror element of the at least one digital micro-mirror device being arranged to reflect electromagnetic radiation within one of at least two pathways;
    at least one electromagnetic radiation measurement arrangement associated with at least one of the at least two pathways and arranged to measure electromagnetic radiation associated with the test image on that pathway; and
    at least one comparator arrangement associated with the electromagnetic radiation measurement arrangement arranged to compare a predetermined value for electromagnetic radiation associated with the test image on a pathway with a value of electromagnetic radiation associated with the test image measured by the electromagnetic radiation measurement arrangement wherein generation of the test image is arranged such that it is not perceived by an observer whilst viewing the desired image.

2. A display apparatus, as claimed in claim 1, wherein one of the at least two pathways includes a primary path between a single electromagnetic radiation source and an exit lens via at least one digital micro-mirror device and one of the at least two pathways includes a secondary path between the single electromagnetic radiation source and an electromagnetic radiation dump via at least one digital micro-mirror device.

3. A display apparatus, as claimed in claim 2, wherein each digital micro-mirror device is arranged to reflect electromagnetic radiation along the primary path to form a desired image at the exit lens and each digital micro-mirror device is arranged to reflect electromagnetic radiation along the secondary path to form a test image at the electromagnetic radiation dump.

4. A display apparatus, as claimed in claim 2, wherein the secondary path includes the electromagnetic radiation measurement arrangement, the electromagnetic radiation measurement arrangement being arranged to measure the electromagnetic radiation reflected by at least one digital micro-mirror device.

5. A display apparatus, as claimed in claim 2, including a first optical element arranged to intersect the primary path, an associated test image electromagnetic radiation source arranged to generate test image electromagnetic radiation, the first optical element being arranged to direct the test image electromagnetic radiation along at least part of the primary path to the at least one digital micro-mirror device, the electromagnetic radiation measurement arrangement being associated with the electromagnetic radiation dump and arranged to measure test image electromagnetic radiation reflected by the at least one digital micro-mirror device.

6. A display apparatus, as claimed in claim 2, including a test image electromagnetic radiation source arranged to generate test image electromagnetic radiation and being arranged to direct the test image electromagnetic radiation along a second primary path to the at least one digital micro-mirror device, the electromagnetic radiation measurement arrangement being associated with a second electromagnetic radiation dump and arranged to measure test image electromagnetic radiation reflected by the at least one digital micro-mirror device.

7. A display apparatus, as claimed in claim 2, including a first optical element arranged to intersect the primary path, an associated test image electromagnetic radiation source arranged to generate test image electromagnetic radiation, the first optical element being arranged to direct the test image electromagnetic radiation along at least part of the primary path, a second optical element arranged to intersect the primary path and electromagnetic radiation measurement arrangement associated with the second optical element, the electromagnetic radiation measurement arrangement being arranged to measure test image electromagnetic radiation reflected by the at least one digital micro-mirror device.

8. A display apparatus, as claimed in claim 7, wherein the first optical element intersects the primary path between the single electromagnetic radiation source and the at least one digital micro-mirror device and the second optical element intersects the primary path between the at least one digital micro-mirror device and the exit lens.

9. A display apparatus, as claimed in claim 7 or claim 8, including a second test image electromagnetic radiation source arranged to generate test image electromagnetic radiation, the test image electromagnetic radiation being arranged to be directed along a pathway between the electromagnetic radiation dump and the at least one digital micro-mirror device and then along a pathway between the at least one digital micro-mirror device and the electromagnetic radiation measurement arrangement via the second optical element.

10. A display apparatus, as claimed in claim 1, wherein one of the at least two pathways includes a first primary path between a single electromagnetic radiation source and an exit lens via the at least one digital micro-mirror device and one of the at least two pathways includes a second primary path between the single electromagnetic radiation source and the exit lens via an optical switch arrangement and the at least one digital micro-mirror device.

11. A display apparatus, as claimed in claim 10, wherein the optical switch arrangement includes an optical switch and an associated mirror.

12. A display apparatus, as claimed in claim 1, wherein one of the at least two pathways includes a first primary path between a first electromagnetic radiation source and an exit lens via the at least one digital micro-mirror device and one of the at least two pathways includes a second primary path between a second electromagnetic radiation source and the exit lens via the at least one digital micro-mirror device.

13. A display apparatus, as claimed in claim 12, wherein the at least one digital micro-mirror device is alternately illuminated by the first electromagnetic radiation source and the second electromagnetic radiation source at a predefined frequency, one of the at least two pathways includes a first secondary path between the first electromagnetic radiation source and a first electromagnetic dump via the at least one digital micro-mirror device and one of the at least two pathways includes a second secondary path between the second electromagnetic radiation source and a second electromagnetic radiation dump via the at least one digital micro-mirror device, each secondary path having an associated electromagnetic radiation measurement arrangement, the electromagnetic radiation measurement arrangement associated with one secondary path being directly connected to a differential amplifier and the electromagnetic radiation measurement arrangement associated with another secondary path being connected to the differential amplifier via a delay line having a predefined delay duration and the differential amplifier being arranged to determine the difference between a signal produced by each electromagnetic radiation measurement arrangement.

14. A display apparatus, as claimed in claim 1, wherein one of the at least two pathways includes a first primary path between a single electromagnetic radiation source and an exit lens via the at least one digital micro-mirror device, one of the at least two pathways includes a secondary path between the single electromagnetic radiation source and a reflector and one of the at least two pathways includes a second primary path between the reflector and the exit lens via the at least one digital micro-mirror device.

15. A display apparatus, as claimed in any of claim 10 to 14, wherein the comparator arrangement includes a memory unit arranged to sum values obtained from an electromagnetic radiation measurement arrangement associated with one of the at least two pathways for a predetermined duration and to sum values obtained from an electromagnetic radiation measurement arrangement associated with another of the at least two pathways for the predetermined duration, the comparator arrangement being arranged to subtract the sum of values for one pathway from the sum of values for the other pathway for the predetermined duration to calculate a difference value and the comparator arrangement being arranged to determine changes between difference values over successive predetermined durations.

16. A display apparatus, as claimed in claim 12, wherein the at least one digital micro-mirror device is alternately illuminated by the first electromagnetic radiation source and the second electromagnetic radiation source at a predefined frequency, one of the at least two pathways includes a first secondary path between the first electromagnetic radiation source and a first electromagnetic dump via the at least one digital micro-mirror device and one of the at least two pathways includes a second secondary path between the second electromagnetic radiation source and a second electromagnetic radiation dump via the at least one digital micro-mirror device, one secondary path having an associated electromagnetic radiation measurement arrangement.

17. A display apparatus, as claimed in claim 1, including one digital micro-mirror device for each of the primary colours of the visible electromagnetic spectrum arranged to generate a colour desired image.

18. A display apparatus, as claimed in claim 1, including a single digital micro-mirror device arranged to generate a monochrome desired image.

19. A display apparatus, as claimed in claim 1, including a single digital micro-mirror device and associated synchronised colour wheel arranged to generate a colour desired image.

20. A display apparatus, as claimed in claim 1, wherein the at least one digital micro-mirror device is arranged to generate a desired image for a majority of a predefined duration and to generate a test image for a minority of the predefined duration.

21. A display apparatus, as claimed in claim 1, wherein the desired image is formed from electromagnetic radiation at a wavelength within the visible electromagnetic spectrum visible.

22. A display apparatus, as claimed in claim 1, wherein the test image is formed from electromagnetic radiation at a wavelength outside of the visible electromagnetic spectrum.

23. A display apparatus as claimed in claim 1, wherein the display apparatus is arranged to be included in a head up or head down display.

* * * * *